United States Patent
Graham et al.

(10) Patent No.: US 9,067,773 B2
(45) Date of Patent: Jun. 30, 2015

(54) PREVENTION OF AGGLOMERATION OF PARTICLES DURING STERILIZATION PROCESSES

(75) Inventors: Chris Graham, Sandy Hook, CT (US); Thaddeus Pesce, White Plains, NY (US); David Bell, Yorktown Heights, NY (US); Michael Abaskhroun, Nanuet, NY (US); Mukesh Kasargode, Danbury, CT (US); Tak Man Lee, Killara (AU); Galo Cadena, Demarest, NJ (US)

(73) Assignee: PepsiCo, Inc., Purchase, NY (US)

( * ) Notice: Subject to any disclaimer, the term of this patent is extended or adjusted under 35 U.S.C. 154(b) by 762 days.

(21) Appl. No.: 12/879,611

(22) Filed: Sep. 10, 2010

(65) Prior Publication Data

US 2012/0060445 A1    Mar. 15, 2012

(51) Int. Cl.
 B65B 55/06    (2006.01)
 B67C 3/04    (2006.01)
 (Continued)

(52) U.S. Cl.
 CPC ............... B67C 3/045 (2013.01); B65B 55/14 (2013.01); B65B 55/06 (2013.01); A23L 2/02 (2013.01); A23L 2/46 (2013.01); A23L 3/001 (2013.01); A23L 3/04 (2013.01); A23L 3/06 (2013.01)

(58) Field of Classification Search
 CPC ............ A23B 7/005; A23L 2/06; A23L 2/46; A23L 3/02–3/085; A23L 2/02; A23L 3/001; B65B 21/22; B65B 55/06; B65B 55/10; B65B 55/14; B67C 3/045
 USPC ............. 426/11, 15, 392, 399–401, 405, 519, 426/131; 99/360–371
 See application file for complete search history.

(56) References Cited

U.S. PATENT DOCUMENTS

| 1,581,780 A | 4/1926 | Brass |
| 2,010,667 A * | 8/1935 | Herold et al. ................... 99/362 |

(Continued)

FOREIGN PATENT DOCUMENTS

| CN | 2719427 | 8/2005 |
| CN | 1903661 | 1/2007 |

(Continued)

OTHER PUBLICATIONS

International Search Report in related International Patent Application No. PCT/US2011/051071 dated Dec. 20, 2011.

(Continued)

Primary Examiner — Drew Becker
(74) Attorney, Agent, or Firm — Banner & Witcoff, Ltd.

(57) ABSTRACT

A method and an apparatus for hot-fill or cold fill sterilization of a container containing both a liquid and solid inclusions. The method and apparatus each prevent the inclusions from agglomerating in any area of the container, such as the container closure, thus allowing the liquid to contact the interior surfaces of the container for a time sufficient to achieve sterilization of the entire container. The filled container is subjected to an inversion sequence typically including alternating between inverting the container to an angle of about 60 degrees from vertical and an angle of about 140 degrees from vertical, over a time period of at least 30 seconds. The apparatus includes a means for conveying containers, configured to subject the containers to a series of angles as the containers are conveyed, as well as an enclosure for preventing the containers from falling off of the conveying means.

22 Claims, 4 Drawing Sheets

(51) Int. Cl.
  *B65B 55/14* (2006.01)
  *A23L 2/02* (2006.01)
  *A23L 2/46* (2006.01)
  *A23L 3/00* (2006.01)
  *A23L 3/04* (2006.01)
  *A23L 3/06* (2006.01)

(56) References Cited

U.S. PATENT DOCUMENTS

| | | | |
|---|---|---|---|
| 2,199,459 A | | 5/1940 | Herold et al. |
| 2,265,803 A | * | 12/1941 | Davis ............................ 366/211 |
| 2,392,395 A | * | 1/1946 | Lehman ......................... 426/398 |
| 2,487,033 A | * | 11/1949 | Thurman et al. .............. 366/218 |
| 2,509,904 A | * | 5/1950 | Bruce ............................ 426/616 |
| 2,517,542 A | * | 8/1950 | Clifcorn et al. ................ 426/405 |
| 2,617,635 A | * | 11/1952 | Ash ................................ 366/214 |
| 2,748,005 A | * | 5/1956 | Baier ............................. 426/401 |
| 3,119,139 A | | 1/1964 | Beard |
| 3,336,722 A | | 8/1967 | Der Winden et al. |
| 3,619,203 A | * | 11/1971 | Heck et al. .................... 426/519 |
| 3,753,651 A | | 8/1973 | Boucher |
| 4,031,764 A | | 6/1977 | Curtis |
| 4,080,974 A | | 3/1978 | Oag |
| 4,148,390 A | | 4/1979 | Ionescu |
| 4,208,761 A | | 6/1980 | Ionescu |
| 4,533,038 A | | 8/1985 | Richard |
| 4,596,469 A | * | 6/1986 | Huntsinger et al. .......... 366/111 |
| 4,817,777 A | | 4/1989 | Postel |
| 4,838,154 A | * | 6/1989 | Dunn et al. ..................... 99/451 |
| 4,861,166 A | | 8/1989 | Kuwabara |
| 4,986,413 A | | 1/1991 | Mraz |
| 5,060,450 A | | 10/1991 | Greenwell et al. |
| 5,119,720 A | * | 6/1992 | Rodriguez ...................... 99/517 |
| 5,277,207 A | | 1/1994 | Perrier |
| 5,320,804 A | | 6/1994 | Zakaria et al. |
| 5,343,998 A | | 9/1994 | Depinet et al. |
| 5,358,092 A | | 10/1994 | Cinotti |
| 5,411,250 A | | 5/1995 | Belec et al. |
| 5,540,318 A | | 7/1996 | Hulse |
| 5,792,421 A | | 8/1998 | Riley |
| 5,810,151 A | | 9/1998 | Catelli et al. |
| 5,957,264 A | | 9/1999 | Carey |
| 5,968,451 A | | 10/1999 | Iwamoto |
| 6,248,986 B1 | | 6/2001 | Tran et al. |
| 6,298,638 B1 | | 10/2001 | Bettle |
| 6,328,928 B1 | | 12/2001 | Schroeder et al. |
| 6,537,493 B1 | | 3/2003 | Mednikov |
| 6,973,767 B2 | | 12/2005 | Wagner et al. |
| 7,025,192 B2 | | 4/2006 | Høeg et al. |
| 7,032,737 B2 | | 4/2006 | Egger |
| 7,066,316 B2 | | 6/2006 | Burger et al. |
| 7,169,420 B2 | * | 1/2007 | Korengel et al. ............. 426/115 |
| 7,299,832 B2 | | 11/2007 | Hartness et al. |
| 7,518,260 B2 | | 4/2009 | Dai et al. |
| 7,553,064 B2 | | 6/2009 | Johnson et al. |
| 7,581,635 B2 | | 9/2009 | Lecomte |
| 8,079,376 B2 | * | 12/2011 | Avelis et al. .................. 134/140 |
| 2002/0083682 A1 | | 7/2002 | Edwards et al. |
| 2004/0005242 A1 | | 1/2004 | Koulik et al. |
| 2007/0012334 A1 | * | 1/2007 | Wolters ............................. 134/1 |
| 2007/0051073 A1 | | 3/2007 | Kelley et al. |
| 2007/0101681 A1 | | 5/2007 | Iwashita et al. |
| 2007/0180796 A1 | * | 8/2007 | Wild et al. ...................... 53/471 |
| 2009/0101178 A1 | | 4/2009 | Wu et al. |
| 2012/0060445 A1 | | 3/2012 | Graham et al. |
| 2012/0251681 A1 | | 10/2012 | Zacharias |

FOREIGN PATENT DOCUMENTS

| | | |
|---|---|---|
| EP | 0455513 | 11/1991 |
| EP | 0968661 | 1/2000 |
| EP | 1 747 997 | 1/2007 |
| GB | 464 568 | 4/1937 |
| GB | 1 014 014 | 12/1965 |

OTHER PUBLICATIONS

International Preliminary Report in related International Patent Application No. PCT/US2011/051071 dated Mar. 21, 2013.
International Search Report and Written Opinion from International PCT Application No. PCT/US13/68074, dated Mar. 4, 2014.
CN Application No. 201180052406.9 Office Action mailed Dec. 27, 2013.

* cited by examiner

PREVENTION OF AGGLOMERATION OF PARTICLES DURING STERILIZATION PROCESSES

FIELD OF THE INVENTION

The invention relates to methods and apparatuses for hot-fill or cold fill sterilization of containers containing a liquid, as well as solid inclusions, in which the inclusions are prevented from agglomerating in any portion of the container during sterilization.

BACKGROUND

Hot-fill sterilization of containers, such as bottles containing beverages, is a well-known method for sterilizing containers to render the container essentially free of microorganisms and microbial growth. Typically, hot-fill sterilization is achieved by heating a liquid to a temperature of at least about 85 degrees Celsius to destroy any microorganisms, then promptly filling a container with the pasteurized hot liquid. Prior to cooling the container, the container is often manipulated to ensure that the hot liquid comes into contact with all of the interior surfaces of the container, including any container closures (e.g., a cap). Such manipulation generally involves turning or inverting the container to contact the hot liquid with all of the interior container surfaces for a time sufficient to sterilize the inside of the container and its closure. Once the container has been completely sterilized, it may then be cooled and safely stored as a shelf stable product without refrigeration, usually for at least several months.

Certain liquids, for instance beverages, contain solid inclusions (e.g., particles) as well as liquid. Inclusions, however, may agglomerate within small portions of a container, such as the neck and/or cap of a bottle. The agglomeration of inclusions may inhibit hot liquid from reaching those portions of the container during manipulation, and result in a container that is not completely sterilized. For instance, one inversion method that has shown to result in agglomeration of inclusions in the neck is the so-called "laydown method." The laydown method involves tilting a hot-filled bottle from a vertical standing position to a horizontal lie-down position, over a time period of about 1-2 seconds. The bottle remains in this position for a specified amount of time, and then is raised back to a vertical standing position. Another inversion method that has shown agglomeration of inclusions in the neck is the so-called "camel hump inverter." The camel hump inverter method involves grabbing a vertical upright bottle by rubber grippers and tilting the bottle until it is tipped 90 degrees on its side. The bottle is transferred to an upright position when it reaches the top of the inverter, and then is tilted 90 degrees on its side in the opposite direction. Accordingly, it would be desirable to prevent agglomeration of inclusions in portions of a container to ensure proper sterilization of the interior of the container using hot-fill processes.

SUMMARY

It is an object of the invention to provide methods for hot-fill sterilization of a container comprising providing a hot-filled container comprising a liquid and a plurality of inclusions and subjecting the hot-filled container to an inversion sequence. The inversion sequence comprises at least a first inversion of the container until the base is located at an angle of up to 140 degrees relative to vertical and occurs over a time period of at least three seconds. The inversion sequence prevents the inclusions from agglomerating in the closure of the container and allows the hot-fill liquid to contact the closure for a time sufficient to sterilize the closure.

The methods may further include an inversion sequence comprising at least eight inversions, occurring over a time period of at least thirty seconds. Optionally, the inversion sequence is repeated in its entirety once or twice (or at least once). The liquid may be a beverage and the inclusions may be food particles, such as fruit sacs.

It is another object of the invention to provide apparatuses for inverting containers comprising a means for conveying a plurality of containers and an enclosure for preventing the plurality of containers from falling off of the conveying means. The conveying means is configured to subject the plurality of containers to a series of angles as the plurality of containers is conveyed. The conveying means is configured to subject the plurality of containers to one or more inversion sequences comprising a first inversion of the containers to an angle of up to 180 degrees relative to vertical, occurring over a time period of at least three seconds. The inversion sequence prevents the inclusions from agglomerating in the closure of the container and allows the hot-fill liquid to contact the interior of the container for a time sufficient to sterilize the container.

DETAILED DESCRIPTION OF EMBODIMENTS OF THE INVENTION

Figure 1:
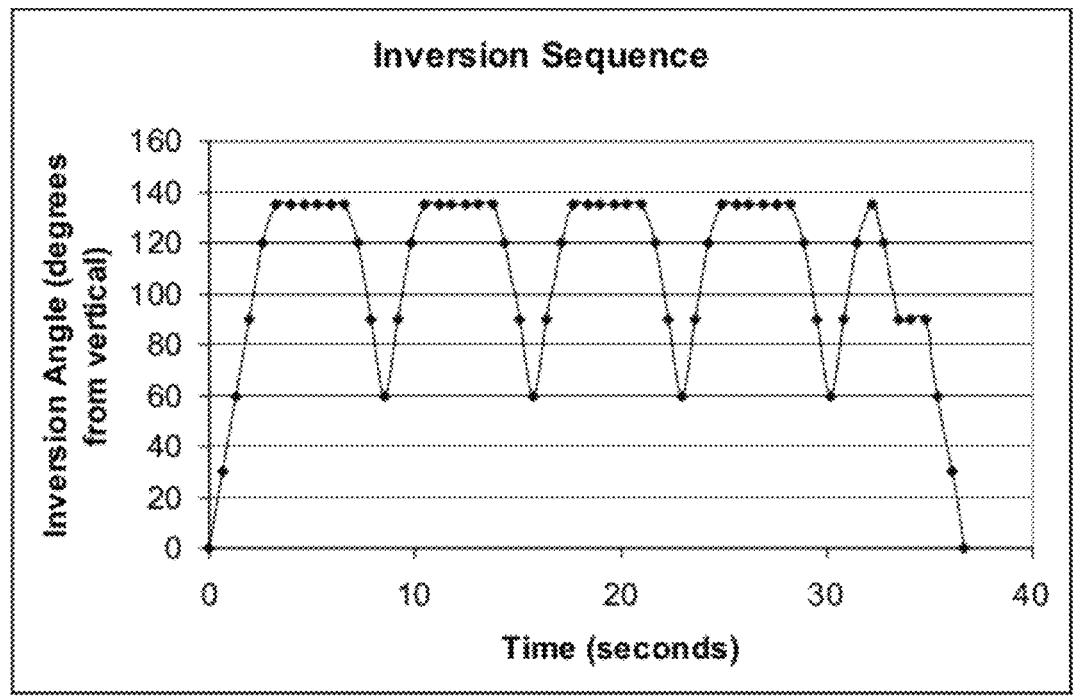
FIG. 1 is a graph of a sample inversion sequence showing inversion angle versus time

It was discovered that a container holding solid inclusions, in addition to a liquid, may successfully be sterilized using hot-fill sterilization processes. In particular, aspects of the invention are directed to methods and apparatuses for sterilizing hot-filled containers by inverting the containers for certain sequences of angles over a certain period of time. The inversion sequences are selected such that the inclusions in the liquid do not agglomerate in any one portion of the container, such as the interior of a neck or closure of the container. For instance, hot-fill sterilization is often employed with beverage bottles, which generally comprise a base portion, a body portion, a neck portion, and a separate cap. With respect to such bottles, the methods and apparatuses of the present invention unexpectedly prevent the inclusions from collecting in a neck portion or the interior of a cap during inversion, thereby allowing the hot-filled liquid to sterilize the neck portion and cap interior, as well as the rest of the container.

In an embodiment, a method for hot-fill sterilization of a container comprises providing a hot-filled container comprising both a liquid and a plurality of inclusions disposed within the container, and subjecting the hot-filled container to an inversion sequence. In another embodiment, a method for hot-fill sterilization of a container comprises providing a container comprising a base and an opening and directing a hot-fill liquid comprising inclusions into the container through the container opening. A closure is also provided, which is adapted to close the container opening, and next the filled container is closed with the closure. The method further comprises placing the filled and closed container vertically upright on the container base and subjecting the hot-filled container to an inversion sequence.

The inversion sequence for both of the above embodiments comprises at least a first inversion of the container until the base is located at an angle of up to 180 degrees relative to vertical. In certain embodiments, the first inversion occurs over a time period of at least three seconds, and the inversion sequence prevents the inclusions from agglomerating in the container and allows the hot-fill liquid to sterilize the container.

It is believed that an inversion sequence may be selected for any liquid and containing any solid inclusions, to provide a series of angles that will bring the liquid into contact with all of the interior surfaces of the container while preventing the inclusions from agglomerating in any portions of the container to an extent that the interior container or closure surface is blocked from sterilization by the liquid. The specific angles and the rate at which the container is inverted to achieve those angles are the critical variables for achieving complete sterilization of the container. For instance, a liquid having a low viscosity may be inverted more rapidly than a liquid having a high viscosity, because less time will be required for the contents of the container to move within the container upon being inverted due to the higher rate of flow of a low viscosity liquid.

Referring to FIG. 1, a graph is provided showing an exemplary inversion sequence for hot-fill sterilization. The graph shows that the container is initially inverted zero degrees, corresponding to the container being placed upright, typically on a base of the container. When the container is a beverage bottle, an inversion angle of zero degrees means that the container is placed on its base and its cap is pointing vertically upward from the base. Next, according to FIG. 1, the container is slowly inverted to 30 degrees, 60 degrees, 90 degrees, 120 degrees, and 135 degrees relative to vertical. This inversion to 135 degrees occurs over a time period of greater than three seconds. Once the container has been inverted to 135 degrees, it remains at that inversion angle for over three seconds. The container is next inverted back to just 60 degrees relative to vertical over a time period of about two seconds, and then returned to an inversion angle of 135 degrees again over about two seconds and subsequently held at 135 degrees relative to vertical for more than another three seconds. As illustrated by the graph of FIG. 1, the container is inverted between 135 degrees and 60 degrees numerous times to ensure sufficient contact between the hot-filled liquid and the upper portions of the container while preventing the inclusions from blocking the interior surface of the upper portions of the container.

Figure 2:
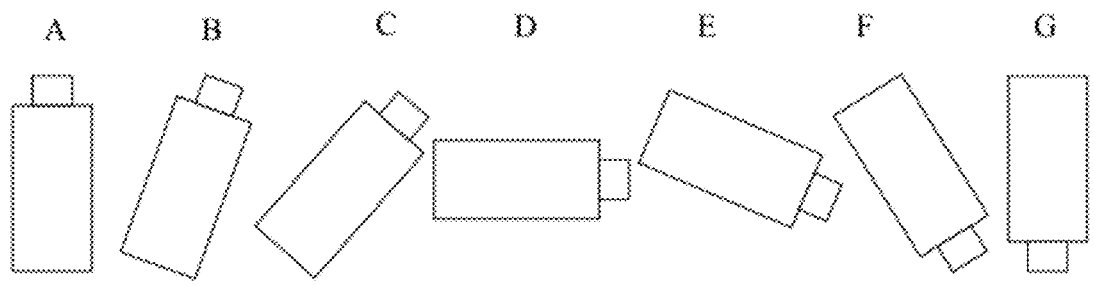
FIG. 2 illustrates containers A through G positioned at various inversion angles relative to vertical.

Referring to FIG. 2, containers A through G are shown, with container A located upright, positioned at zero degrees relative to vertical. Containers B and C are each positioned at angles in between zero and 90 degrees relative to vertical, whereas container D is positioned an angle of 90 degrees relative to vertical. Likewise, containers E and F are each positioned at angles in between 90 and 180 degrees relative to vertical, whereas container G is positioned an angle of 180 degrees relative to vertical.

Inversion of a container to an angle of greater than about 90 degrees relative to vertical assists in causing the liquid to flow to the upper end of the container, and holding at that angle provides time for the hot liquid to sterilize the container. In addition, the inversion from the selected angle back to an angle of less than about 90 degrees causes the inclusions to flow away from the upper end of the container and thereby prevents the inclusions from agglomerating at the upper end. Concomitantly, for hot-fill sterilization of a container shaped differently than a typical beverage bottle, the angles of inversion will be selected to prevent the inclusions from agglomerating in whichever area of the container is narrow or small.

In an embodiment, the container is a beverage bottle and is initially placed upright on its base, at zero degrees relative to vertical, following hot-fill. The hot-filled bottle is then subjected to an inversion sequence in which the bottle is inverted to between 45 and 140 degrees relative to vertical. In alternate embodiments, the hot-filled bottle is inverted to between 0 and 180 degrees relative to vertical, such as between 30 and 180 degrees relative to vertical or between 60 and 135 degrees relative to vertical.

Similar to FIG. 1, the inversion sequence according to certain embodiments of the invention comprises repeatedly inverting the container back and forth between several selected angles. At least one of the angles is less than 90 degrees with respect to vertical, while at least one of the angles is greater than 90 degrees with respect to vertical. Put another way, at least one of the angles is greater than zero degrees but less than 90 degrees relative to vertical, while at least one of the angles is greater than 90 degrees but less than 180 degrees relative to vertical.

Alternating between inversion of the container at angles greater than 90 degrees and less than 90 degrees initiates the flow of the liquid and inclusions towards the upper end of the container, and then away from the upper end of the container, respectively. In an embodiment, the inversion sequence comprises inverting the container between inversion angles greater than 90 degrees and less than 90 degrees relative to vertical at least three times. In another embodiment, the inversion sequence comprises alternating the inversion angles at least four times, or at least five times. In certain embodiments, the entire inversion sequence is repeated once or twice. Depending on the container type and characteristics of the liquid and inclusions, the inversion sequence may be repeated as many times as necessary to achieve sterilization of the hot-filled container. Alternatively, a first inversion sequence may be followed by a second inversion sequence that comprises inversion angles that are different from the inversion angles of the first The amount of time taken to invert a container is critical to successfully preventing the inclusions from agglomerating and to achieving sterilization of the container. For example, if a container is inverted too rapidly, the inclusions will be quickly forced towards the upper portion of the container and will thus have a greater likelihood of plugging up the top of the container. In contrast, a slow inversion of the container is analogous to decanting a solution, and the liquid will tend to flow to the upper portion of the container before the inclusions travel to the upper portion of the container.

In an embodiment, the inversion sequence comprises an initial inversion of the container to an angle greater than 90 degrees relative to vertical over a time period of from 0.5 to 6.5 seconds, or from 1.0 to 6.0 seconds, or from 1.5 to 5.5 seconds, or from 2.0 to 5.0 seconds, or from 2.5 to 4.5 seconds, or from 3.0 to 4.0 seconds. The time at which the container is held at the maximum inversion angle in the inversion sequence may be from 0.5 to 8.5 seconds, or from 1.0 to 8.0 seconds, or from 1.5 to 7.5 seconds, or from 2.0 to 7.0 seconds, or from 2.5 to 6.5 seconds, or from 3.0 to 6.0 seconds, or from 3.5 to 5.5 seconds. Similarly, the time period for returning the container to a smaller inversion angle, such as to an angle less than 90 degrees relative to vertical, occurs over a time period of from 0.5 to 6.5 seconds, or from 1.0 to 6.0 seconds, or from 1.5 to 5.5 seconds, or from 2.0 to 5.0 seconds, or from 2.5 to 4.5 seconds, or from 3.0 to 4.0 seconds. Moreover, each separate inversion of the container to a different inversion angle may be performed over the time periods disclosed above.

As discussed above with respect to FIG. 1, in certain embodiments of the invention, once the container has been inverted to the maximum angle of the inversion sequence, it remains at that inversion angle for a certain amount of time, such as for over three seconds. In particular, holding the container in an inverted position for a period of time allows the hot liquid to sterilize the interior of the upper portion of the container. In an embodiment, the container is held at an angle greater than 90 degrees for at least one second, or at least two seconds, or at least three seconds, or at least four seconds, prior to returning the container back to an inversion angle of less than 90 degrees.

In certain embodiments of the invention, the total time for subjecting a container to a single inversion sequence is at least 30 seconds, such as from 15 to 50 seconds, or from 20 to 45 seconds, or from 25 to 40 seconds, or from 30 to 35 seconds. Accordingly, when a container is subjected to multiple inversion sequences, the container may undergo inversion for the hot-fill sterilization process for up to several minutes, such as for up to two minutes, or up to 3 minutes, or up to 4 minutes, or up to five minutes.

The inversion sequence and timing will depend on several factors, such as the shape and size of container being subjected to the hot-fill sterilization process, the kind of liquid being hot-filled, and the type of inclusions present in the liquid. In an embodiment, the container is a beverage bottle, such as a 420 mL or 1000 mL polyethylene terrephthalate (PET) bottle. In alternate embodiments, the container is a 355 mL PET bottle, or a 240 mL glass bottle. Typically, embodiments of the invention can been applied to almost any PET or glass bottle with inclusions.

Many liquids may be employed with the hot-fill sterilization process, such as aqueous liquids. For example, but without limitation, the liquid may be a beverage selected from the group consisting of non-carbonated soft drinks, ready-to-drink beverages, coffee beverages, tea beverages, dairy beverages, as well as liquid concentrates, flavored waters, enhanced waters, juice drinks and juice-flavored drinks, sport drinks, and alcoholic products. The hot-fill sterilization processes may be used with liquids having a viscosity of as low as about 0.2 centipoises up to about 200 centipoises, or up to 100 centipoises, or up to 50 centipoises, or up to 25 centipoises. Typically, the thicker the liquid, the more slowly the container needs to be inverted during the one or more inversion sequences in order to allow the liquid to flow to the upper end of the container upon inversion. A Brookfield Viscometer and a HAAKE Rheometer are suitable types of equipment used to measure the liquid viscosity for embodiments of the invention.

The inclusions provided in the liquid are not particularly limited. In certain embodiments, the inclusions may be fruit components, for instance bitable fruit pulp, fruit vesicles, and/or fruit sacs. Such fruit components my include, by way of example without limitation, bitable components of orange, pomelo, lemon, lime, passionfruit, tangerine, mandarin orange, citron, clementine, kumquat, blood orange, and combinations thereof. As used herein, the term "bitable fruit" refers to fruit pieces that are discernibly compressed when bitten into. Fruit components that are not bitable are also suitable for the methods described herein, for instance portions of citrus endocarp, which is the membrane that separates the citrus fruit into sections, or small fragments of pulp or pericarp.

In exemplary embodiments, the inclusions comprise a wide range of shapes, particle sizes, and densities. It will be appreciated by one of skill in the art that the period of time selected for each inversion in an inversion sequence will be dependent on the rate at which the particular inclusions flow within the liquid upon inversion of the hot-filled container. For instance, inclusions having high densities (i.e., mass per unit volume) will travel faster through the liquid and reach the upper end of the container upon inversion more quickly than inclusions having lower densities. Accordingly, the time period selected over which to subject the container to a maximum inversion angle will be longer for a liquid containing particles having a higher density than the time period for a liquid containing particles having a lower density.

Any suitable fruit or vegetable components may be employed in the liquid, for example and without limitation, any solid components selected from the group consisting of coconut, aloe vera, plum, prune, date, currant, fig, grape, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, papaya, litchi, lemon, orange, lime, tangerine, tangelo, pomelo, mandarin, grapefruit, tomato, beet, avocado, pumpkin, squash, artichoke, watercress, spinach, lettuce, celery, cucumber, zucchini, cauliflower, legumes, broccoli, leek, onion, kohlrabi, turnip and parsnip.

Figure 3:
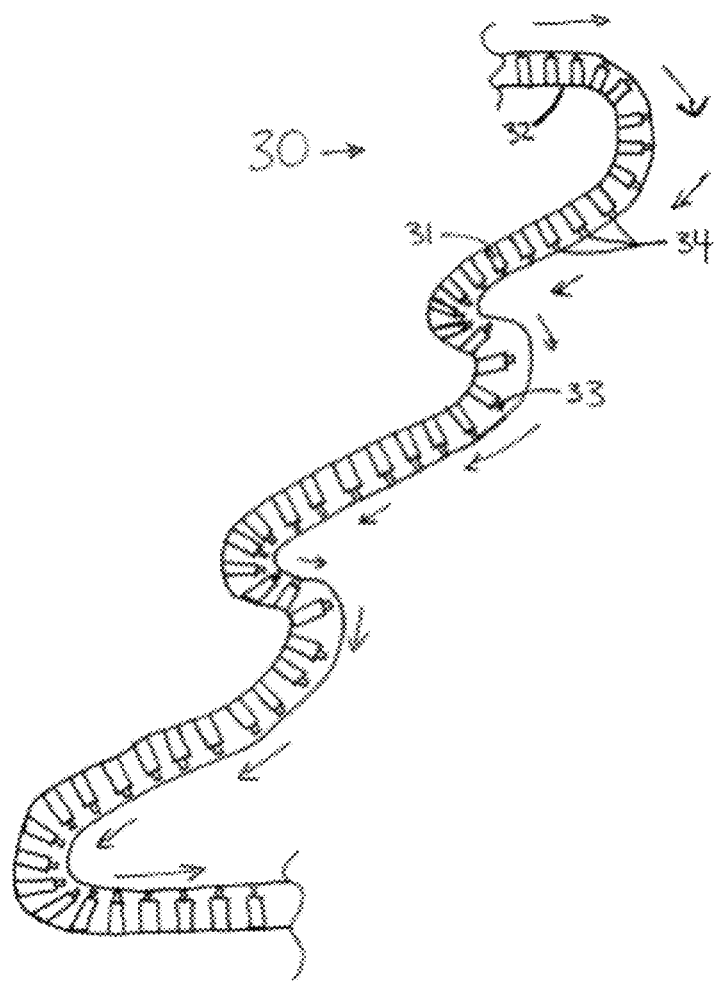
FIG. 3 illustrates a conveyor means for an apparatus for inverting containers and set for a specific inversion sequence, according to one embodiment of the invention.

Embodiments of the invention comprise apparatuses for use in performing the hot-fill sterilization processes. In one embodiment, the apparatus comprises a means for conveying a plurality of containers. The conveying means is configured to subject the plurality of containers to a series of angles as the containers are conveyed. Referring to FIG. 3, a conveying means 30 is illustrated. The conveying means 30 comprises a conveyor belt 32 configured to affix to and run along a frame (not shown) having a specific design. For instance, according to the embodiment of FIG. 3, the design along which the conveyor belt 32 travels is a kind of "S" shape. The shape is configured such that each of a plurality of containers 34 placed on the conveyor belt 32 is subjected to an inversion sequence. The illustrated inversion sequence begins with the containers placed on the conveyor belt 32 upright, at an angle of zero degrees relative to vertical. As the conveyor belt 32 travels in the direction of the arrows in FIG. 3, the containers 34 undergo a first inversion from zero degrees relative to vertical to an angle of between 90 and 180 degrees, of approximately 135 degrees. As discussed above, the time required to complete the first inversion of the containers is selected according to the characteristics of the containers and both the fluid and inclusions present within the hot-filled containers.

The frame of the conveyor means is configured to next cause the conveyor belt 32 to continue traveling at the same inversion angle for a predetermined period of time to allow the fluid within the containers to remain in contact with the upper portions of the container and sterilize the upper portions of the container. The containers 34 shown in FIG. 3 are containers that each comprises a body 31 and a neck 33, wherein the neck 33 has a smaller diameter than the body 31. Accordingly, the neck 33 of a container 34 in particular undergoes sterilization while the containers 34 are held at the inversion angle between 90 and 180 degrees relative to vertical.

In order to urge the inclusions away from the necks 33 of the containers 34, the conveyor belt 32 curves over a period of time, moving the containers 34 such that the containers 34 are passed through lower inversion angles, such as down to between 0 and 90 degrees relative to vertical. As illustrated in FIG. 3, the conveyor belt 32 then proceeds through several further inversions, including holding the containers 34 at an inversion angle between 90 and 180 degrees relative to vertical for two more times. Typically, an apparatus according to embodiments of the invention is configured to provide an inversion sequence comprising at least eight inversions, wherein each inversion comprises crossing the 90 degree line relative to vertical (i.e., perpendicular to vertical). In certain embodiments, the apparatus resembles a roller coaster, wherein the containers are analogous to passengers and the conveyor means is analogous to the roller coaster cars.

Figure 4:
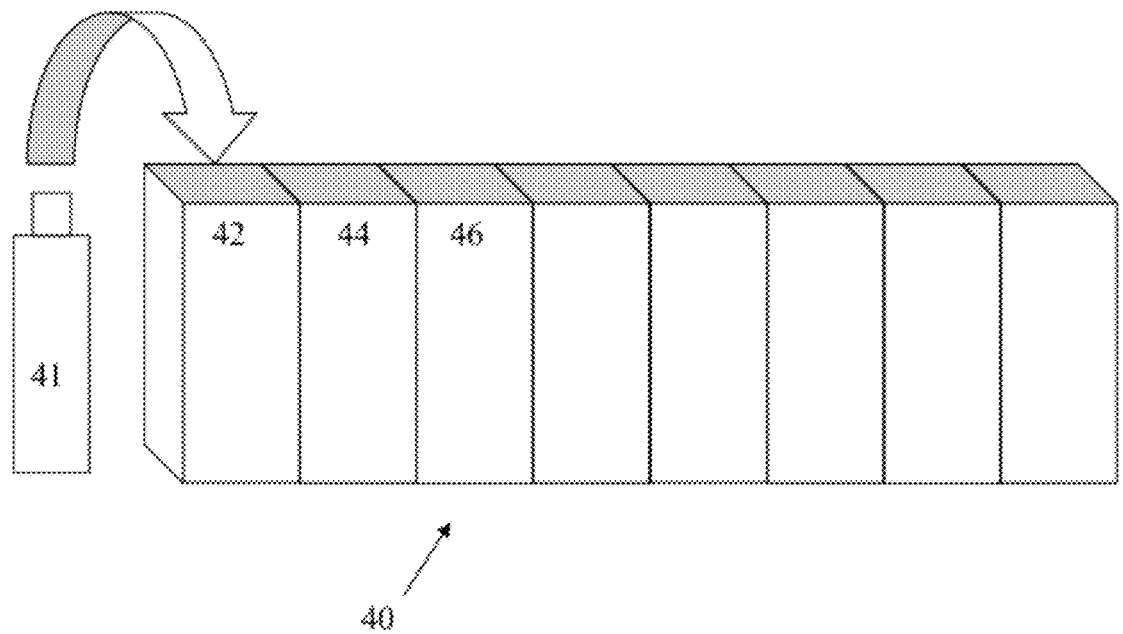
FIG. 4 illustrates a perspective view of a portion of a conveyor means comprising pockets

Referring to FIG. 4, a portion of a conveyor means is illustrated. In this embodiment, the conveying means 40 comprises a plurality of pockets 42, 44, 46, etc, wherein each of the plurality of pockets is configured to contain one or more containers 41. Including pockets in the conveying means allows the containers to be isolated from each other and/or to assist in stabilizing the containers within the conveying means upon subjection to inversion during hot-fill sterilization of the containers.

In certain embodiments, an enclosure is disposed above the conveying means for preventing the plurality of containers from falling off of the conveying means. In one aspect, the enclosure comprises a lid for the conveying means, such that gravity does not cause the containers to fall out or off of the conveying means when the containers are inverted to an angle of 90 degrees or greater relative to vertical. Optionally, the lid comprises a metal plate. In certain embodiments, the apparatus comprises insulation disposed around the at least a portion of the conveying means and the enclosure, to assist in maintaining the temperature of the liquid in the containers during the sterilization process. For example, the insulation may be disposed around the conveying means and the enclosure over the entire length of the apparatus, or over a portion of the length of the apparatus. In embodiments of the invention, the apparatus comprises a heating means to assist in maintaining the temperature of the liquid in the containers during the sterilization process, particularly when the apparatus is employed in cold environments. Such heating means may comprise any means typically used in the art, such as steam heating. For instance, in one aspect, the apparatus comprises an insulated steam jacket disposed around at least a portion of the conveying means and the enclosure. The conveying means is configured to subject the plurality of containers to one or more inversion sequences comprising a first inversion of the container until the base is located at an angle of up to 180 degrees relative to vertical, wherein the first inversion occurs over a time period of at least three seconds, and wherein the inversion sequence prevents the inclusions from agglomerating in the plurality of containers and allows the hot-fill liquid to sterilize the plurality of containers.

Figure 5:
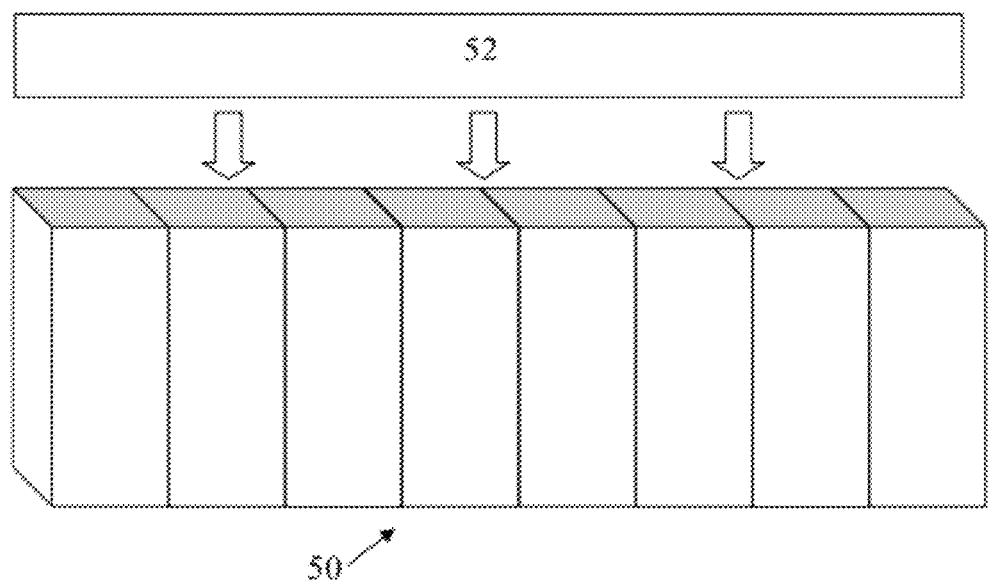
FIG. 5 illustrates the portion of a conveyor means of FIG. 4 and a top view of an enclosure according to an embodiment.

Referring to FIG. 5, an enclosure means 52 is disposed above a conveying means 50 for preventing the plurality of containers from falling off of the conveying means, such as when the containers are subjected to inversion angles. In particular, the enclosure means 52 of FIG. 5 comprises a lid configured to be affixed on top of the conveying means 50.

Accordingly, when the enclosure means 52 is employed with the conveying means 50, any containers disposed within the conveying means 50 will be protected from being tipped out of the conveying means 50 when the containers are positioned at angles greater than 90 degrees with respect to vertical. The main characteristic of the enclosure means according to embodiments of the invention is that it will hold each bottle sufficiently tightly in place so that it does not fall off the conveyor or shift during the inversion process.

Figure 6:
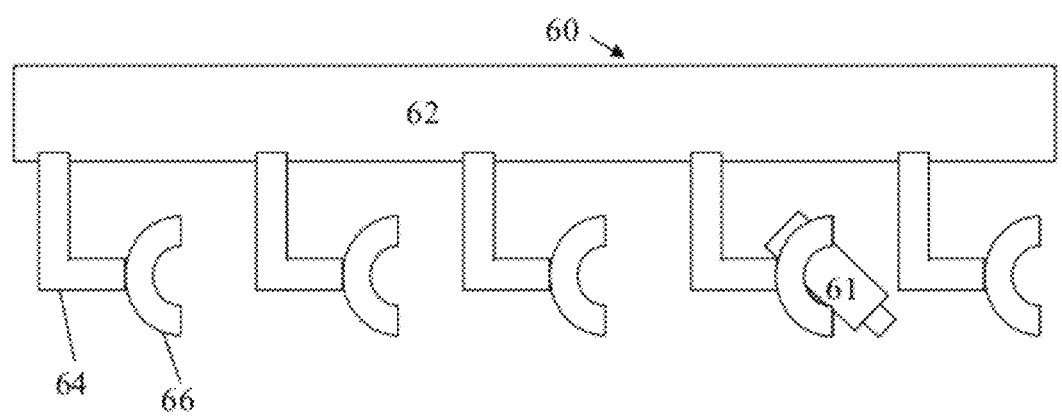
FIG. 6 illustrates a side view of an apparatus for inverting containers according to another embodiment of the invention.

Referring to FIG. 6, an alternate apparatus 60 is provided for use in performing hot-fill sterilization processes. In this embodiment of the invention the apparatus 60 comprises a housing 62 and a plurality of arms 64 disposed on the housing 62 and extending therefrom perpendicular to the housing 62. Further, the apparatus 60 comprises a plurality of clamps 66, and each clamp 66 is configured to be attached to the distal end of one of the arms 64 of the apparatus 60. One container 61 is then held within one clamp 66. The apparatus 60 performs the hot-fill sterilization of the containers 61 by causing the plurality of clamps 66 to rotate, thereby inverting the plurality of containers 61. The apparatus 60 may comprise a motor (not shown) configured to drive the plurality of clamps 66 through one or more complete inversion sequences as described above to carry out the hot-fill sterilization of the containers 61.

EXAMPLES

Example 1

A juice beverage containing mandarin orange sacs was prepared, comprising the ingredients listed in Table 1. Nine hundred gallons of the beverage was heated to a temperature of 85 degrees Celsius and held at that temperature for 30 seconds. Next, the hot beverage was filled into 420 mL PET bottles and capped. Prior to cooling, the hot-filled bottles were placed on an apparatus and subjected to three inversion sequences. Each inversion sequence comprised the inverting the containers to the angles plotted in the graph of FIG. 1. Each inversion sequence was performed over a time period of 36.7 seconds, for a total of 110.1 seconds for the three inversion sequences. The sterilization method was tested by taking temperature measurements on the inside of the bottle caps, as well as performing a micro incubation study on 30,000 bottles of hot-filled product. The micro incubation analysis of the bottles showed achievement of sterility of 100% of the bottles.

Comparative Example 2

A juice beverage containing mandarin orange sacs was prepared and filled into 420 mL PET bottles according to the method disclosed in Example 1. Prior to cooling, the hot-filled bottles were subjected to a camel hump inversion process for six seconds. The camel hump inversion method involved grabbing a vertical upright bottle by rubber grippers and tilting the bottle until it was tipped 90 degrees on its side. The bottle was transferred to an upright position when it reached the top, and then was tilted 90 degrees on its side in the opposite direction. A micro incubation analysis of the bottles exhibited sterility failure of 10% of the bottles.

While the invention has been described with respect to specific examples including presently preferred modes of carrying out the invention, those skilled in the art will appreciate that there are numerous variations and permutations of the above described structures that fall within the spirit and scope of the invention. It should be understood that the invention is not limited in its application to the details of construction and arrangements of the components set forth herein.

Variations and modifications of the foregoing are within the scope of the present invention. It is also being understood that the invention disclosed and defined herein extends to all alternative combinations of two or more of the individual features mentioned or evident from the text. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art. In particular, it is contemplated to use the apparatus, methods, or combinations thereof for cold fill sterilization processes, as well as for other processes for which it is desired to prevent agglomeration of inclusions in a container that comprises inclusions and at least one liquid. It is therefore contemplated that such modifications can be made without departing from the spirit or scope of the present invention as defined in the appended claims.

The invention claimed is:

1. A method for a single-temperature, hot-fill sterilization of a container comprising a base portion and a neck portion, and filled with a hot-fill liquid containing inclusions, the method comprising:
providing a hot-fill containing inclusions and pre-heated to not higher than a sterilization temperature of the container to which it is to be added;
filling the container with the hot-fill liquid at the sterilization temperature of the container to provide a hot-filled container; and
subjecting the hot-filled container to an inversion sequence, during which the inclusions do not aggregate in the container, the inversion sequence comprising at least a first inversion of the container until the base is located at an angle of up to 180 degrees relative to vertical, wherein the first inversion occurs over a time period of at least three seconds, and a second inversion of the container, in the opposite direction, back to an angle of less than 90 degrees relative to vertical, wherein the inversion sequence is repeated at least once, prevents the inclusions from agglomerating in at least the neck portion of the container, and allows the hot-fill liquid to sterilize the container.

2. The method of claim 1, wherein the first inversion inverts the container until the base is located at an angle of up to 135 degrees relative to vertical.

3. The method of claim 1, wherein the inclusions are fruit sacs.

4. The method of claim 1, wherein the hot-fill liquid comprises a beverage.

5. The method of claim 4, wherein the hot-fill liquid comprises at least one aqueous liquid.

6. The method of claim 1, wherein the inversion sequence is performed by an enclosed apparatus configured to convey the container through the inversion angles.

7. The method of claim 1, wherein the second inversion comprises inversion of the container back to an angle of about 60 degrees relative to vertical.

8. The method of claim 7, wherein the second inversion occurs over a time period of about two seconds.

9. The method of claim 7, wherein the inversion sequence further comprises a third inversion of the container between an angle of about 60 degrees from vertical and an angle of about 135 degrees from vertical, and wherein the third inversion occurs over a time period of about two seconds.

10. The method of claim 1, wherein the inversion sequence comprises at least eight inversions and occurs over a time period of at least thirty seconds.

11. The method of claim 1, wherein the first inversion comprises holding the container at an angle of about 135 degrees relative to vertical for at least about three seconds.

12. An apparatus for inverting a plurality of containers comprising:
a means for conveying a plurality of containers, each of the plurality of containers comprising a base portion and a neck portion, the conveying means configured to subject the plurality of containers to a series of angles as the plurality of containers are conveyed; and
an enclosure disposed above the conveying means for preventing the plurality of containers from falling off of the conveying means,
wherein the conveying means is configured to subject the plurality of containers to one or more inversion sequences comprising a first inversion of the containers until the bases are located at angle of up to 180 degrees relative to vertical, wherein the first inversion occurs over a time period of at least three seconds, and a second inversion of the containers, in the opposite direction, back to an angle of less than 90 degrees relative to vertical wherein the inversion sequence is repeated at least once, prevents inclusions from agglomerating in the neck portions of each of the plurality of containers, and allows a hot-fill liquid to sterilize the plurality of containers.

13. The apparatus of claim 12, wherein the conveying means comprises a plurality of pockets, wherein each of the plurality of pockets is configured to contain one container.

14. The apparatus of claim 12, wherein the enclosure comprises a lid for the conveying means.

15. The apparatus of claim 14, wherein the apparatus further comprises insulation disposed around at least a portion of the conveying means and the enclosure.

16. The apparatus of claim 14, wherein the apparatus further comprises an insulated steam jacket disposed around at least a portion of the conveying means and the enclosure.

17. The apparatus of claim 12, wherein the one or more inversion sequences each comprise inverting the plurality of containers between an angle of about 60 degrees from vertical and an angle of about 135 degrees from vertical, and wherein the one or more inversion sequences each occur over a time period of at least 30 seconds.

18. The apparatus of claim 17, wherein the one or more inversion sequences each comprise holding the plurality of containers at one or more angles for at least half of a second each.

19. The apparatus of claim 12, wherein the conveying means is configured to convey bottles comprising a volume selected from the group consisting of 240 mL, 355 mL, 420 mL, and 1000 mL.

20. A method for a single temperature, hot-fill sterilization of a container comprising:
providing a container comprising a base a neck portion, and an opening;
directing a hot-fill liquid comprising inclusions into the container through the container opening to provide a hot-filled container, wherein the liquid is pre-heated to not higher than a sterilization temperature of the container to which it is to be added;
providing a closure adapted to close the container opening;
closing the hot-filled container with the closure;
placing the hot-filled and closed container vertically upright on the container base; and
subjecting the hot-filled and closed container to an inversion sequence, the inversion sequence comprising a first inversion of the container until the base is located at an angle of up to 180 degrees relative to vertical, wherein the first inversion occurs over a time period of at least three seconds, and a second inversion of the container, in the opposite direction, back to an angle of less than 90 degrees relative to vertical, wherein the inversion sequence is repeated at least once, prevents the inclusions from agglomerating in the neck portion of the container, and allows the hot-fill liquid to contact the closure for a time sufficient to sterilize the closure.

21. The method of claim 20, wherein the container is held at an angle of up to 140 degrees relative to vertical for at least three seconds.

22. The method of claim 20, wherein the inversion sequence comprises inverting the container between an angle of about 60 degrees from vertical and an angle of about 135 degrees from vertical, and wherein the inversion sequence occurs over a time period of at least 30 seconds.

\* \* \* \* \*